(No Model.)
J. W. THOMPSON.
ORE WASHER AND COLLECTOR.
No. 569,894.
Patented Oct. 20, 1896.
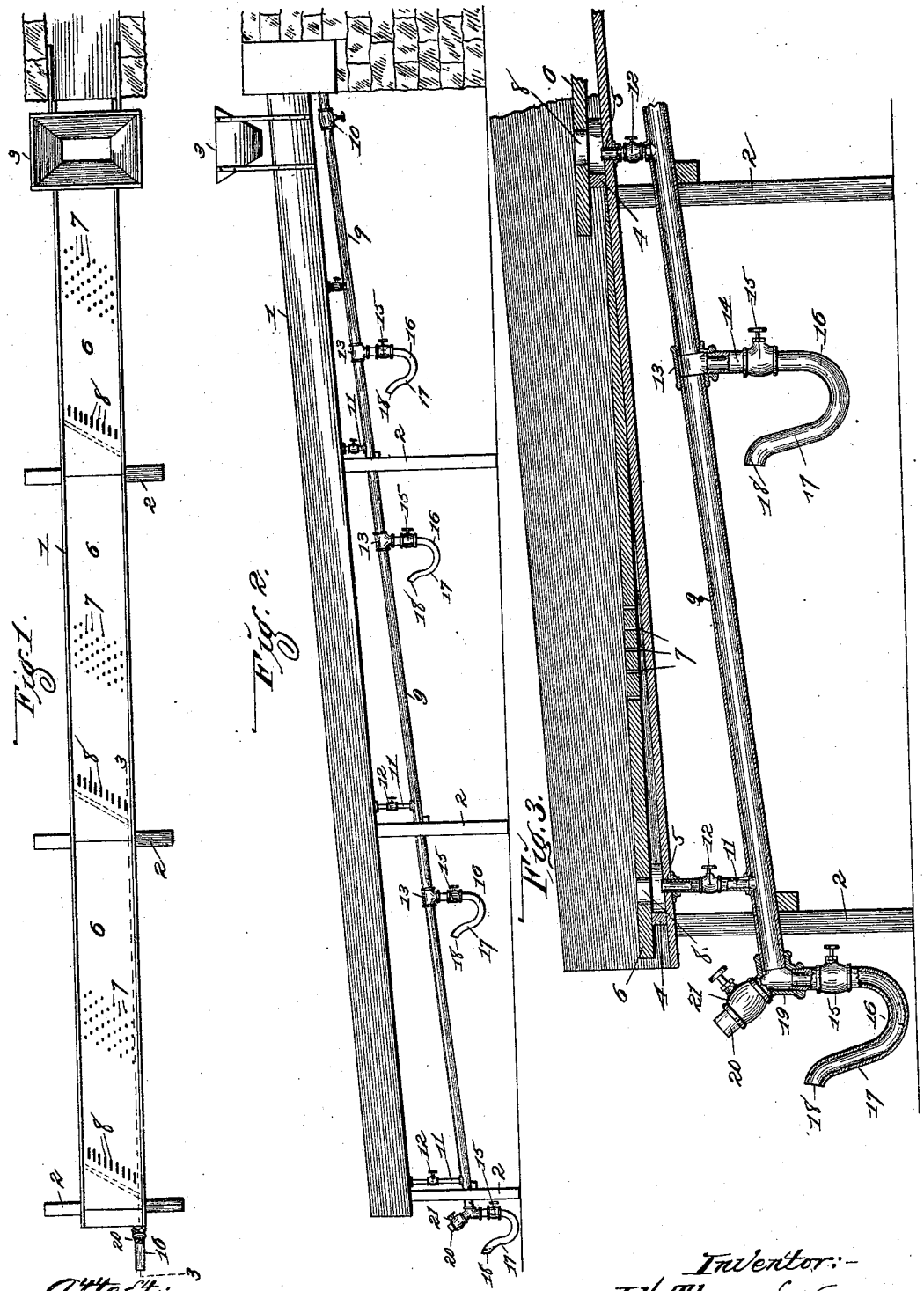

UNITED STATES PATENT OFFICE.

JAMES W. THOMPSON, OF ST. LOUIS, MISSOURI.

ORE WASHER AND COLLECTOR.

SPECIFICATION forming part of Letters Patent No. 569,894, dated October 20, 1896.

Application filed February 26, 1896. Serial No. 580,924. (No model.)

*To all whom it may concern:*

Be it known that I, JAMES W. THOMPSON, of the city of St. Louis, State of Missouri, have invented certain new and useful Improvements in Ore Washers and Collectors, of which the following is a full, clear, and exact description, reference being had to the accompanying drawings, forming a part hereof.

My invention relates to an improved ore washer and collector; and it consists in the novel construction, combination, and arrangement of parts hereinafter described and claimed.

In the drawings, Figure 1 is a top plan view of my improved ore washer and collector. Fig. 2 is a side elevation of the same. Fig. 3 is an enlarged longitudinal sectional view taken approximately on the indicated line 3 3 of Fig. 1.

Referring by numerals to the accompanying drawings, 1 indicates a chute or trough which may be of any size desired, and said trough is constructed so that its discharge end is in a plane lower than the head end, and said trough is supported on suitable trestle-work or standards 2. A volume of water is arranged by any suitable means to be discharged into the head end of this trough 1, and a hopper, such as 3, may be located immediately above said head end. Fixed to the floor or bottom board of the trough at equal distances apart and extending diagonally from one side board of the trough to the other are cleats or ribs 4, and immediately in front of each of said cleats and adjacent one edge of the bottom board of the trough are formed apertures 5.

6 6 indicate auxiliary or false bottoms, the rear ends of which abut against the diagonally-arranged cleats and the forward ends of which lie directly upon said cleats. The rear ends of these auxiliary or false bottoms 6 are wedge-shaped in order that they will lie upon the bottom board of the trough in a more nearly horizontal plane. Formed in each of these false bottoms 6 at points intermediate their ends are series of rows of apertures 7, and located in the forward ends of each of said bottoms at a point where they will lie directly in front of the diagonally-arranged cleats 4 is a row of longitudinally-extending slots 8. Extending from the race or other means which is used to lead water to the trough or chute 1 to the forward end of said trough is a pipe 9, which may be of any size desired, and at a point immediately in front of where said pipe leads from the race or other water supply is located a cut-off valve 10.

11 11 indicate tubes, preferably of a smaller diameter than is the tube 9, and said tubes 11 are tapped into said tube 9 and extend from thence upwardly to and through the apertures 5 in the bottom. In the trough 1 and in said vertically-arranged tubes 11 are located any form of cut-off valve 12.

Located in the pipe 9 at various points along its length, but preferably at slight distances in front of where said pipes 11 connect said pipe 9, are three-way connections 13, in which are located the upper ends of downwardly-extending pipes 14, the lower ends of which carry cut-off valves 15. Removably located in the lower ends of these valves 15 are the upper ends of the shorter arms of U-shaped traps 16, the same being constructed, preferably, of glass or analogous transparent material, and the longer arms 17 of these traps extend upwardly and slightly outwardly to a point in a plane above the upper end of the shorter arm, and said longer arm terminates in an outward bend 18. At the discharge end of the pipe 9 is fixed a three-way connection 19, to the upwardly-extending portion of which is fixed a short discharge-tube 20, in which is located a cut-off valve 21.

The operation is as follows: A small quantity of mercury is placed in each of the traps 16 and the water from the race is then allowed to flow through the trough or chute 1 and the pipe 9. The valves 12 in the vertical pipes 11 will open, and the valves 15 between the vertical pipes 14 and the traps 16 are opened to allow the water to flow freely through the traps 16, and said valves 15 are adjusted or set so that the force of the flow of water through said traps 16 is not quite strong enough to carry the bodies of mercury out of said traps. The valve 21 in the overflow-pipe 20 may be opened and regulated, and a quantity of the water passing through the pipe 9, which of course is under great pressure, may discharge through said valve 21 and pipe 20. The disintegrated ore-bearing soil or rock is now fed through the hopper 3 in the head of the chute 1, and as said ore-bearing material strikes the flow of water through the chute the lighter particles of earth, &c., will be immediately carried in with the flow of water over the false bottoms 6 and with said water discharged from the end of the trough. The particles of ore and the particles of earth-carrying ore will, owing to their specific gravity, pass downwardly through the flow of water through the trough onto the false bottoms 6 and, traveling along on said false bottoms, will pass downwardly through the apertures 7. From thence said ore and whatever particles of sand or earth which have not yet been washed from the particles of ore will pass along the floor of the trough 1, and after lodging against the diagonally-arranged cleats or bars 4 will pass downwardly through the vertical tubes 11 and into the inclined pipe 9. Here the entire body of material will be subjected to a further washing by the water that passes through said tube 9, and said material will pass along through said pipe 9 until it encounters the vertically-arranged pipes 14, through which said material will pass downwardly through the valve 15 and into the traps 16. Here all of the mineral will amalgamate with the bodies of mercury located in said traps 16 and be held thereby, while all of the sand, disintegrated rock, soil, &c., will pass off through said trap with the flow of water therethrough, thus leaving the free mineral to amalgamate with the mercury. After a proper length of time, or when a certain amount of material has been washed through the chute and pipes, the traps 16 are removed and the bodies of mercury containing the free ore are discharged from said traps, after which the ore can be separated from the mercury in the usual manner. By constructing the chute or trough of proper length and properly adjusting the cut-off valves 12 and 15 every particle of ore in the body of material can be separated from said material and caught in the hereinbefore-described traps.

Thus will be seen how I have constructed means for separating all minerals having a greater specific gravity than the material with which they are mixed or in which they are held by thoroughly washing the same and then passing said mineral with a flow of water through a trap in which a body of mercury is located, the force of the flow of water being controlled and regulated by any suitable means, such as valves, water-gates, &c.

An ore washer and collector of my improved type is simple in construction and operation, requires but very little attention, and very expeditiously performs the work required to separate the mineral from the body of material, and much time and labor are saved by an ore-washer of this construction.

In some instances I find that the use of mercury may be dispensed with, as certain grades of ore will by their own specific gravity be deposited in the traps and all of the material from which said ore has been washed will pass off through said traps. Where light or float ore is being washed from ore-bearing material, a perforated plate or section of wire-mesh coated with mercury may be located at a suitable point in the trap 16, and by so doing none of the light ore will be carried off by a flow of water through said trap.

I claim—

An ore washer and collector, comprising an inclined trough, cleats extending diagonally across the bottom of said trough, there being apertures in said bottom board adjacent to one edge and immediately in front of the lower end of each of said cleats, auxiliary bottoms in said troughs, the forward ends of which lie upon said cleats and the rear ends of which abut against the next cleat up the trough, there being apertures in said auxiliary bottoms, an inclined pipe under said trough, tubes connecting said pipe with said trough, traps depending from said pipe, and mercury in said traps.

In testimony whereof I affix my signature in presence of two witnesses.

JAMES W. THOMPSON.

Witnesses:
  JOHN C. HIGDON,
  MAUD GRIFFIN.